United States Patent
Shirokoshi et al.

[11] Patent Number: 5,931,054
[45] Date of Patent: Aug. 3, 1999

[54] FLEXIBLE MESHING TYPE GEAR DRIVE HAVING SPECIFIC SEQUENCES OF ACTUAL TEETH REMOVED

[75] Inventors: Norio Shirokoshi; Harushige Aoyagi, both of Nagano-ken, Japan

[73] Assignee: Harmonic Drive Systems, Inc., Tokyo, Japan

[21] Appl. No.: 08/970,624

[22] Filed: Nov. 14, 1997

[30] Foreign Application Priority Data

Nov. 20, 1996 [JP] Japan .................................. 8-309293

[51] Int. Cl.$^6$ ........................................................ F16H 1/32
[52] U.S. Cl. ....................................................... 74/640
[58] Field of Search .............................................. 74/640

[56] References Cited

U.S. PATENT DOCUMENTS

| | | | |
|---|---|---|---|
| 2,906,143 | 9/1959 | Musser | 74/640 |
| 3,415,143 | 12/1968 | Ishikawa | 74/640 |
| 4,823,638 | 4/1989 | Ishikawa | 74/640 |
| 4,974,479 | 12/1990 | Bakermans et al. | 74/640 |
| 5,458,023 | 10/1995 | Ishikawa et al. | 74/640 |
| 5,485,766 | 1/1996 | Ishikawa | 74/640 |

FOREIGN PATENT DOCUMENTS 1043387  9/1983  U.S.S.R. ................................ 74/640

*Primary Examiner*—Khol Q. Ta
*Attorney, Agent, or Firm*—Burns, Doane, Swecker & Mathis LLP

[57] ABSTRACT

A flexible meshing type gear drive 1 has a rigid internal gear 2 and a flexible external gear 3 whose tooth profiles are defined as follows. First, initial tooth profiles of these gears 2, 3 are defined as in the case that the tooth number of the rigid internal gear is 102 and that of the flexible external gear is 100. The initial tooth profile is adopted as it is for that of the rigid internal gear 2. While, the actual tooth profile of the flexible external gear 3 is determined by thinning out one tooth at every one tooth from the external teeth 34-1, 2, 3, . . . of the initial tooth profile to form tooth bottom portions connecting the respective remaining external teeth 34-1, 3, 5, . . . . Since the flexible external gear 3 has the thus obtained tooth profile in which the tooth bottom portions 35b between the teeth are wider than those 35a of the conventional tooth profile, stress concentration occurring in the tooth bottom portions 35b can be suppressed, whereby the flexible meshing type gear drive having a low reduction ratio can easily be obtained.

3 Claims, 2 Drawing Sheets

FLEXIBLE MESHING TYPE GEAR DRIVE HAVING SPECIFIC SEQUENCES OF ACTUAL TEETH REMOVED

BACKGROUND OF THE INVENTION

1. Field of the Invention

The present invention relates to a flexible meshing type gear drive, and in particular to a flexible meshing type gear drive having a flexible external gear capable of realizing a low reduction ratio.

2. Related Art Statement

A typical flexible meshing type gear drive comprises a circular rigid internal gear, a flexible external gear arranged inside the circular rigid internal gear, and a wave generator for deforming the flexible external gear into, for example, an ellipsoid to mesh it with the rigid internal gear partially. The wave generator is driven by a motor to move the meshing portions between the gears circumferentially, whereby relative rotation therebetween is occurred in accordance with the difference in tooth number between the gears.

The circular rigid internal gear is normally fixed to a device housing (not shown) wherein relative rotation is output from the flexible external gear. Typically, the difference in tooth number between the gears is 2n (n: positive integer), and, for example, the flexible external gear has the external teeth, the number of which is two fewer than that of the circular rigid internal gear. In this case, the reduction ratio of the flexible meshing type gear device 1 is expressed by the following equation.

$$i = 1/R$$
$$= (Zf-Zc) / Zf$$
$$= -2 / Zf$$

where

Zc: tooth number of the circular rigid internal gear, and

Zf: tooth number of the flexible external gear.

Provided that Zc=202 and Zf=200, the reduction ration i becomes −1/100 in which symbol '−' means that the rotational direction of the output is opposite against that of the rotational input, while symbol '+' means that the output rotational direction is the same as the input rotational one.

As the reduction ratio of a flexible meshing type gear device becomes low, the amount of deformation of the flexible external gear along the radial direction becomes large, whereby excessive stress concentration occurs in the bottom portion of the external teeth of the external gear. Thus, a flexible meshing type gear device having a low reduction ratio must be provided with a flexible external gear of the type having a high fatigue strength. If it cannot assure the sufficient fatigue strength of a flexible external gear, a flexible meshing type gear drive having a low reduction ratio cannot be realized practically.

SUMMARY OF THE INVENTION

Accordingly, an object of the present invention is to provide a flexible meshing type gear drive which has a flexible external gear of the type having wide tooth bottom portions for preventing stress concentration in order to make the reduction ration as low as possible.

For the purpose of realizing the above and other objects, according to the present invention, there is provided a flexible meshing type gear drive which comprises a circular rigid internal gear, a flexible external gear having external teeth meshable with internal teeth of the internal gear, and a wave generator inserted into the flexible external gear which deforms the flexible external gear radially to mesh the external teeth thereof with the internal teeth of the internal gear partially and which moves meshing portions of the external and internal teeth circumferentially, wherein the tooth profiles of the internal and external teeth are defined as follows.

First, the tooth number Zc of the rigid internal gear is set to be an even number, and the tooth number Zf of an imaginary flexible external gear is set to be an even one as well. In addition, the tooth numbers Zc and Zf are set to satisfy that the tooth difference therebetween is 2n (n: positive integer). Under these conditions, the tooth profiles of both gears are determined by using a conventional method. Such methods and resultant tooth profiles of both gears are disclosed, for example, in U.S. Pat. Nos. 2,906,143, 3,415,143, 4,823,638, 4,974,479, 5,458,023 and 5,485,766, the contents of which are incorporated herein by reference. The resultant tooth profile is employed for the internal gear.

While, an actual tooth profile of the external gear is obtained by modifying the resultant tooth profile. Namely, the resultant external teeth of the imaginary flexible external gear are thinned out by 'm' teeth at intervals of 'm' teeth (m: odd number), to form wide tooth bottom portions between the respective remaining teeth, whereby the actual tooth profile of the actual flexible external gear is obtained. The flexible external gear having the obtained tooth profile has a tooth number Zf which is (m+1)×L (L: positive integer).

On the other hand, where the tooth number Zc of the rigid internal gear and the number Zf of an imaginary flexible external gear are both an odd number, the tooth profiles of both gears are determined by using a conventional method with maintaining the difference in tooth number between the gears being 2n (n: positive integer). Then the resultant teeth of the imaginary flexible external gear are thinned out by 'k' teeth at intervals of 'k' teeth (k: positive even number), to thereby form tooth bottom portions connecting between the respective remaining teeth, whereby the tooth profile of the actual flexible external gear is obtained. In this case also, the actual flexible external gear has a tooth number Zf that is (k+1)×L (L: positive integer).

BRIEF DESCRIPTION OF THE DRAWINGS

FIGS. 3A and 3B show procedures of defining tooth profiles of the external and internal gears of the flexible meshing type gear drive of FIG. 1, respectively, while

DETAILED DESCRIPTION OF PREFERRED EMBODIMENTS

While the present invention will be described in connection with preferred embodiments, it is not intended to limit the present invention to those embodiments. On the contrary, it is intended to cover all modifications, alternatives and equivalents which are included in a scope or spirit of the present invention as defined by attached claims.

Figure 1:
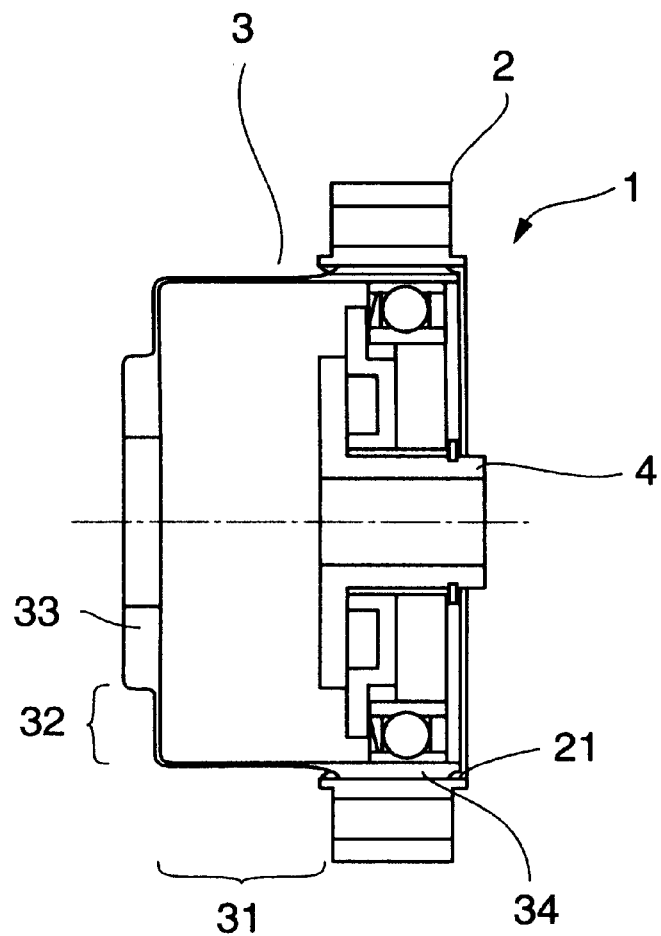
FIG. 1 is a schematic sectional view of a typical cup-shaped flexible meshing type gear drive.
Figure 2:
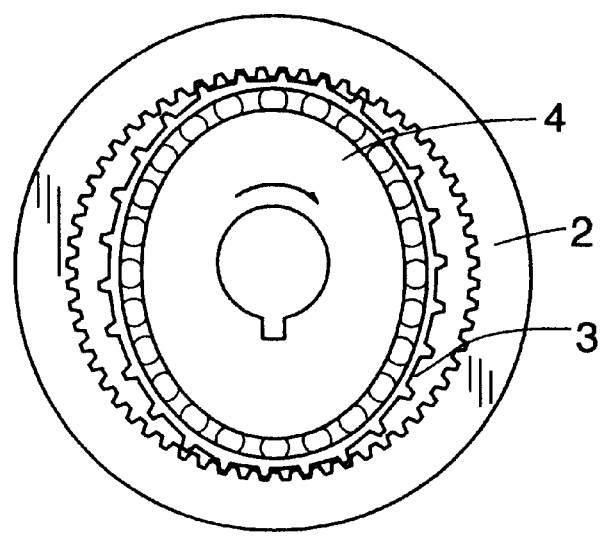
FIG. 2 is a schematic front view of the drive of FIG. 1.

FIGS. 1 and 2 show a cup-shaped flexible meshing type gear drive of an example according to the present invention. The cup-shaped flexible meshing type gear drive 1 comprises a circular rigid internal gear 2, a cup-shaped flexible external gear 3 placed inside the internal gear 2, and an elliptical wave generator 4 inserted into the flexible external gear 3. The cup-shaped external gear 3 is constituted by an annular body 31, a circular diaphragm 32 covering one open end of the boy 31, a boss 33 integrally formed on the center portion of the diaphragm, and external teeth 34 formed on the outer circumferential surface of the other open end of the boy 31.

The flexible external gear 3 is deformed into an ellipsoid by the wave generator 4, so that two portions of the external gears located on major axis of the ellipsoid are being meshed with corresponding portions of internal teeth 21 formed on the inner circumferential surface of the internal gear 2. Rotation of the wave generator by a motor causes the engaging portions between the gears 2 and 3 to move circumferentially.

Since the rigid internal gear 2 is fixed to a device housing (not shown) so as not to rotate, rotational output can be derived from the flexible external gear 3. Instead of rigid internal gear 2, the flexible external gear 3 may be fixed so as not to rotate and rotational output may be derived from the rigid internal gear.

In this embodiment, the tooth number Zc is 102, and the number Zf is 50. The tooth profile of each of the internal and external gears 2 and 3 of the flexible meshing type gear drive 1 is defined as follows.

First, initial tooth profiles of these gears 2 and 3 are defined as in the case where the rigid internal gear has 102 teeth and the flexible external gear has 100 teeth. The flexible external gear having 100 teeth is referred to as an 'imaginary flexible external gear' here in this specification. The obtained initial tooth profile is adopted as it is for the rigid internal gear 2.

Next, the teeth of the imaginary flexible external gear are thinned out by one at every one tooth, to form tooth bottom portions connecting between the respective remaining teeth, whereby a tooth profile for the actual flexible external gear 3 can be obtained.

Figure 3A:
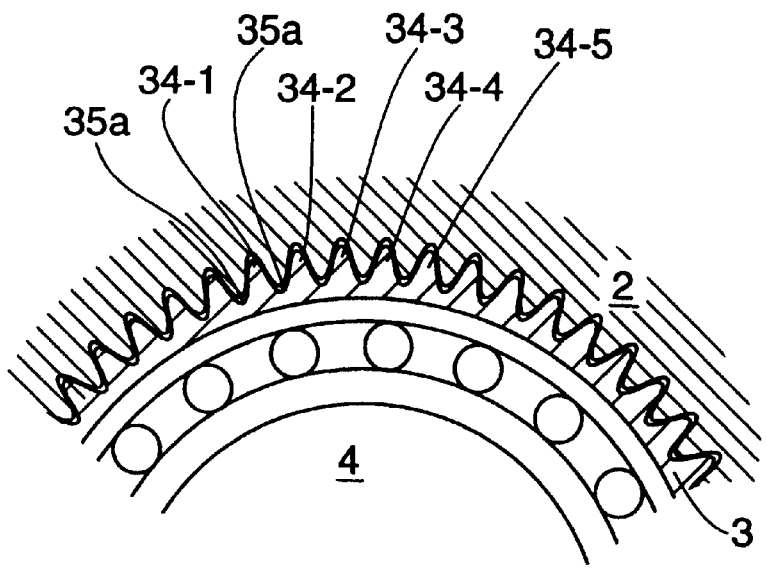
Figure 3B:
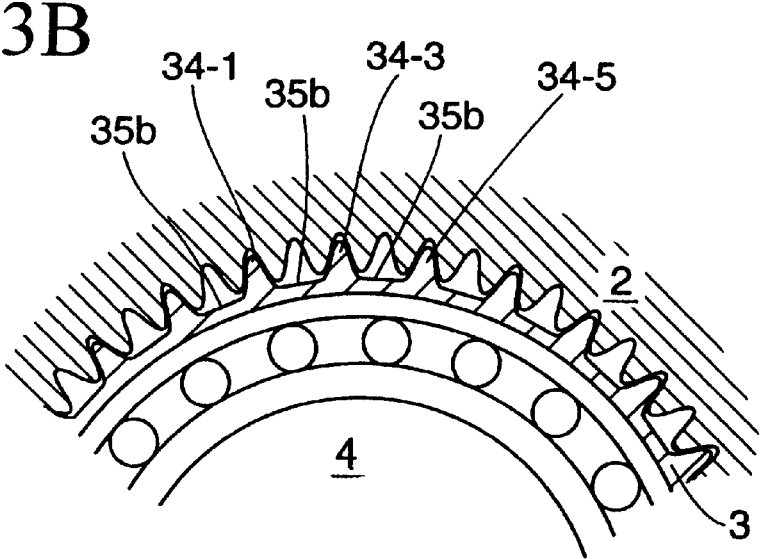
Figure 3C:
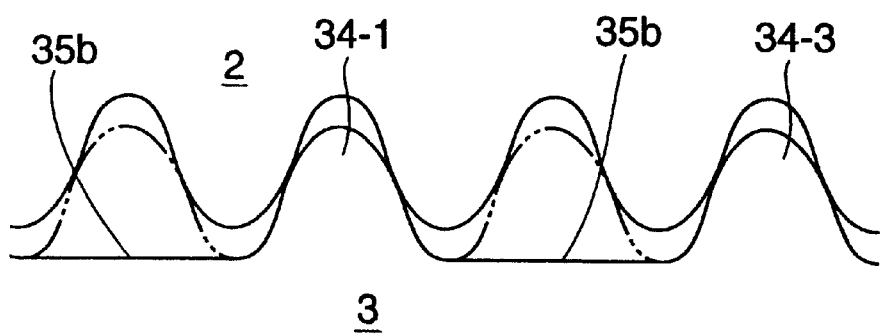
FIG. 3C is a partially enlarged view showing tooth portions of both gears of FIG. 3B.

More specifically, as shown in FIG. 3A, the imaginary flexible external gear 300 has 100 teeth 34-1, 34-2, 34-3, 34-4, 34-5 . . . , among which the external teeth 34-2, 34-4, 34-6 . . . are thinned out. The portions where the thinned-out teeth were located are then shaped to form tooth bottom portions 35b connecting between the respective remaining teeth 34-1, 34-3, 34-5 . . . FIGS. 3B and 3C show the tooth profile as defined above.

The flexible meshing type gear drive 1 which comprises the flexible external gear 3 having the tooth profile as defined above has a reduction ratio that is the same as that of a flexible meshing type gear drive which comprises the rigid internal gear 2 having 102 teeth and the imaginary flexible external gear 300 having 100 teeth, namely −1/50. It is noted that the flexible meshing type gear drive 1 of this embodiment has the flexible external gear 3 whose tooth profile is defined such that the tooth bottom portions 35b are wider than the bottom portions 35a of the conventional flexible external gear, that is, the imaginary flexible gear 300. Therefore, stress concentration occurred in the tooth bottom portions 35b can be greatly suppressed, whereby the flexible meshing type gear drive having a low reduction ratio can easily be realized.

In this embodiment, the present invention is applied to a cup-shaped flexible meshing type gear drive having a cup-shaped flexible external gear as mentioned above. Alternatively, the present invention can also be applied in a similar manner to a flexible meshing type gear drive having a flexible external gear of the shape other than the cup shape.

As described above, according to the present invention, the tooth profile of the flexible external gear is defined such that the tooth bottom is wider than that of the conventional tooth profile for realizing the same reduction ratio. Accordingly, the stress concentration which occurs in the bottom portions of the external gear can be suppressed or prevented, so that a flexible meshing type gear drive having a low reduction ratio can easily be obtained.

We claim:

1. A flexible meshing type gear drive which has a circular rigid internal gear formed with internal teeth, a flexible external gear placed inside the rigid internal gear and formed with external gear meshable with the internal gear, a wave generator inserted into the flexible external gear for deforming it radially to mesh partially the external teeth with the internal teeth and for moving meshing portions in a circumferential direction, characterized in that a tooth profile of each of the rigid internal gear and an imaginary flexible external gear is defined under the condition that tooth numbers of the rigid internal gear and that of the imaginary flexible external gear are both even number, and a difference in tooth number of the gears is 2n (n: positive integer), and the external teeth of the imaginary flexible external gear are thinned out by 'm' teeth at intervals of 'm' teeth (m: positive odd number) to form tooth bottom portions connecting between the respective remaining external teeth, wherein an actual tooth profile for the flexible external gear is obtained.

2. A flexible meshing type gear drive according to claim 1, wherein a value of 'm' is one.

3. A flexible meshing type gear drive which has a circular rigid internal gear formed with internal teeth, a flexible external gear placed inside the rigid internal gear and formed with external gear engageable with the internal gear, a wave generator inserted into the flexible external gear for deforming it radially to engage partially the external teeth with the internal teeth and for moving engaging portions in a circumferential direction, characterized in that a tooth profile of each of the rigid internal gear and an imaginary flexible external gear is defined under the condition that tooth numbers of the rigid internal gear and that of the imaginary flexible external gear are both even numbers, and a difference in tooth number of the gears is 2n (n: positive integer), and the external teeth of the imaginary flexible external gear are thinned out by 'k' teeth at intervals of 'k' teeth (k: positive even number) to form tooth bottom portions connecting between the respective remaining external teeth, wherein an actual tooth profile for the flexible external gear is obtained.

\* \* \* \* \*